(12) United States Patent
Bousquet et al.

(10) Patent No.: US 8,400,517 B2
(45) Date of Patent: Mar. 19, 2013

(54) STABILIZATION OF CAPTURED IMAGES

(75) Inventors: Marc Bousquet, Paris (FR); Sylvain Negroni, Paris (FR)

(73) Assignee: Sagem Defense Securite, Paris (FR)

( * ) Notice: Subject to any disclaimer, the term of this patent is extended or adjusted under 35 U.S.C. 154(b) by 224 days.

(21) Appl. No.: 13/072,952

(22) Filed: Mar. 28, 2011

(65) Prior Publication Data

US 2011/0242338 A1 Oct. 6, 2011

(30) Foreign Application Priority Data

Mar. 30, 2010 (FR) ...................................... 10 52371

(51) Int. Cl.
*H04N 5/228* (2006.01)
*G03B 17/00* (2006.01)

(52) U.S. Cl. .................... 348/208.99; 348/208.2; 396/55

(58) Field of Classification Search .. 348/208.99–208.7; 396/55

See application file for complete search history.

(56) References Cited

U.S. PATENT DOCUMENTS

| | | | | |
|---|---|---|---|---|
| 5,502,482 | A * | 3/1996 | Graham | 348/140 |
| 5,861,915 | A | 1/1999 | Sato et al. | |
| 6,734,901 | B1 | 5/2004 | Kudo et al. | |
| 8,150,250 | B2 * | 4/2012 | Saito et al. | 396/55 |
| 8,319,842 | B2 * | 11/2012 | Shibata | 348/208.6 |
| 2005/0018051 | A1 * | 1/2005 | Tomita et al. | 348/208.4 |
| 2006/0274156 | A1 * | 12/2006 | Rabbani et al. | 348/208.99 |
| 2008/0239084 | A1 * | 10/2008 | Endo | 348/208.4 |
| 2009/0002501 | A1 * | 1/2009 | Silsby et al. | 348/208.16 |
| 2009/0185042 | A1 * | 7/2009 | Miyahara | 348/208.4 |
| 2009/0231444 | A1 * | 9/2009 | Shibata | 348/208.1 |
| 2009/0231452 | A1 * | 9/2009 | Noguchi | 348/208.11 |
| 2010/0085436 | A1 * | 4/2010 | Ohno | 348/208.1 |
| 2011/0037860 | A1 * | 2/2011 | Broekaert et al. | 348/208.1 |
| 2011/0234822 | A1 * | 9/2011 | Miyasako | 348/208.1 |

FOREIGN PATENT DOCUMENTS

| | | |
|---|---|---|
| EP | 1507408 A2 | 2/2005 |
| WO | WO 2008/000711 A2 | 1/2008 |

OTHER PUBLICATIONS

International Search Report and Written Opinion from counterpart French application No. FR1052371; Report dated Nov. 10, 2010.

* cited by examiner

*Primary Examiner* — Tuan Ho
*Assistant Examiner* — Selam Gebriel
(74) *Attorney, Agent, or Firm* — Miller, Matthias & Hull LLP

(57) ABSTRACT

Images captured by an image capture device on a line of sight with an associated gyrometric system designed to supply gyrometric measurement data relating to the line of sight are stabilized. To this end, a first series of captured images is obtained. Then, a second series of stabilized images is obtained by applying, to the first series of images, an image stabilization based on gyrometric information. Then, a residual stabilization error is determined by applying a digital processing to the second series of stabilized images. Finally, the preceding three steps are repeated. On initialization, the gyrometric information corresponds to the measurement data supplied by the gyrometric system. Then, subsequently, the gyrometric information is obtained by correcting, on the basis of the residual error, the measurement data supplied by the gyrometric system.

9 Claims, 2 Drawing Sheets

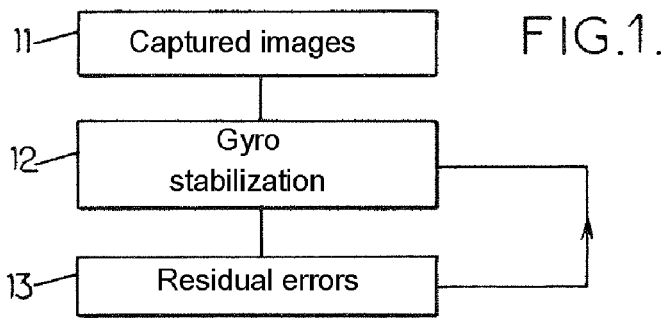
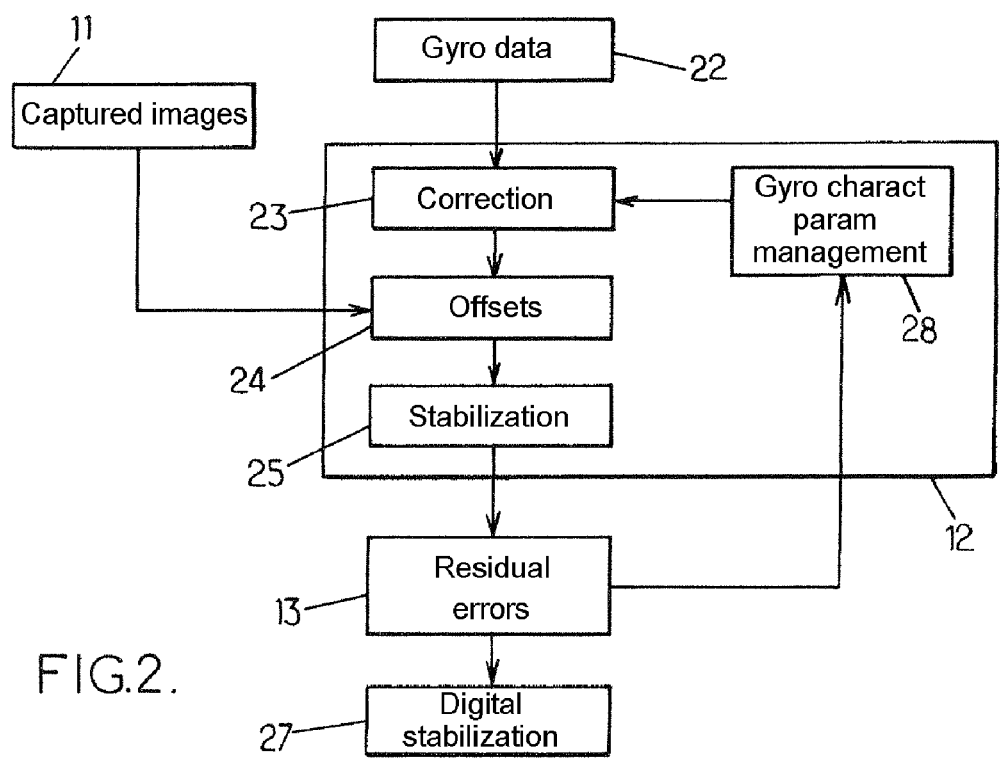

STABILIZATION OF CAPTURED IMAGES

CROSS-REFERENCE TO RELATED APPLICATIONS

This application claims priority under the Paris Convention to the French Patent Application No. 10 52371, filed on Mar. 30, 2010.

FIELD OF THE DISCLOSURE

The present invention relates to image processing and more particularly to the stabilization of images captured by an image capture device, such as a video camera for example.

When a camera is subjected to involuntary movements, such as, for example, the movements of the holder of the device, the captured images may be of poor quality. Indeed, the involuntary movements of the line of sight of the camera may introduce a 'movement blur' which affects the quality of the captured images.

It is possible to envisage using data supplied by gyrometers as a basis for stabilizing the line of sight and thus avoiding the movement blur. In this case, an image stabilization is applied on the basis of data supplied by the gyrometers.

Alternatively, to digitally stabilize the captured images, notably by applying a digital image processing such as that described in the document FR 2 828 315. In this case, the image stabilization is based on offsets between the successive images which are determined by digital processing.

Thus, the stabilization is either based on offsets supplied by gyrometers, or based on offsets determined by digital processing applied to the images to be stabilized.

A document WO 2008/000711 describes a stabilization method which relies both on the use of data supplied by gyroscopes and on a digital processing of the captured images. More specifically, according to the teaching of this document, firstly, approximate offsets between the successive images are determined on the basis of gyrometric measurements, then fine offsets are determined on the basis of the approximate offsets and the stream of images.

Then, provision is made to stabilize the images by applying either the fine offsets if they are considered as relevant, or the approximate offsets in the case where the fine offsets obtained would not be relevant. To this end, there is therefore a step for assessing the fine offsets in order to determine if it is relevant to apply them.

It should be noted that some known stabilization devices already implement a stabilization based on gyrometric measurements. In such devices, the implementation of a method such as that described in the document WO 2008/000711 requires a modification of the existing architecture. In practice, when a gyrometric stabilization is implemented, the calculated offsets are applied to the captured images, and thus, at the output of this stabilization step, images stabilized on the basis of the gyrometric measurements are obtained. Consequently, if there is a desire to assess the value of the fine offsets before choosing between fine offsets and approximate offsets, the existing architecture must be modified.

Furthermore, according to the teaching of document WO 2008/000711, in some cases, the image stabilization is performed only on the approximate offsets. Now, these approximate offsets do not make it possible to obtain a fine and accurate stabilization. Thus, it is sometimes not possible to obtain an efficient stabilization by applying the teaching of document WO 2008/000711.

SUMMARY

The present invention aims to improve the situation.

A first aspect of the present invention proposes a method for stabilizing images captured by an image capture device on a line of sight with an associated gyrometric system designed to supply gyrometric measurement data relating to the line of sight,
said method comprising the following steps:
/a/ obtaining a first series of captured images;
/b/ obtaining a second series of stabilized images by applying, to the first series of images, an image stabilization based on gyrometric information;
/c/ determining a residual stabilization error by applying a digital processing to the second series of stabilized images; and
/d/ repeating steps /a/ to /c/;
wherein, on the first iteration of step /b/, the gyrometric information corresponds to the measurement data supplied by the gyrometric system, and on an iteration following step /b/, the gyrometric information is obtained by correcting, on the basis of said residual error, the data supplied by the gyrometric system.

The expression 'image stabilization' should be understood to mean an operation consisting in realigning the successive images relative to one another, in order to reduce or even cancel out the effects of movements of the line of sight during the capture of these images. In practice, between two successive images, the line of sight may have undergone roll, pitch or yaw rotations or even changes of focal length, in the case of a camera for which the zoom factor can be varied, translational movements and angular and linear vibrations. The image stabilization therefore aims to cancel out these movements which affect the quality of the captured images, by compensating them.

Here, provision is made on the one hand to use gyrometric measurement data supplied by the gyrometric system to stabilize the captured images, and, on the other hand, to use a digital processing to correct these gyrometric measurement data. Thus, in these conditions, it is possible to stabilize the captured images accurately on the basis of the corrected gyroscopic measurement data. The accuracy and the reliability of such a stabilization makes it possible both to obtain a second series of quality images and to reduce the complexity of the calculations performed while the digital processing is being implemented in the step /c/. In practice, since the second series of images exhibits a reliable stabilization, the residual error obtained by applying the digital processing is easy to determine.

It should be noted that each gyrometer has characteristic parameters. Obtaining these characteristic parameters accurately and precisely currently entails costly measurement operations in the manufacturing phase. Furthermore, these characteristic parameters which are measured during manufacture may not be stable over time. Such is the case in particular for inexpensive gyrometers. Thus, advantageously, by virtue of the retroactive correction of the gyrometric information, it is here possible to stabilize the captured images accurately even when the gyrometric system consists of inexpensive gyrometers.

It is easy for those skilled in the art to determine offsets between the captured images in order to stabilize them on the basis of raw gyrometric measurement data supplied by the gyrometers used. To this end, provision may be made to use a mathematical model which takes into account a greater or lesser number of characteristic parameters of the gyrometric system used and of its operating environment (temperature, accelerations, statistical or frequential model of the involuntary and deliberate movements, etc.). The accuracy and the number of the characteristic parameters taken into account in the mathematical model make it possible to improve the accuracy of the offsets obtained. Then, on the basis of such a model, it is possible to correct, in a relevant and accurate manner, the gyroscopic measurement data supplied by the gyroscopic system, even when these data are supplied by inaccurate gyrometers.

Furthermore, it is easily possible to implement an image stabilization in the context of an already existing stabilization architecture, which is based on gyrometric measurement data. In practice, it is simple to add, in series, without having to modify the existing architecture relating to a stabilization relying on gyrometric measurement data, a step of applying digital processing that aims to determine a residual stabilization error. It is possible here to obtain, on the basis of the gyrometric measurement data, an offset between two captured images with an accuracy of the order of 1 pixel, when the data supplied by the gyrometric system are corrected retroactively according to one embodiment of the present invention.

By virtue of these retroactive corrections, the gyrometric information makes it possible to accurately calculate offsets between the captured successive images, and no longer only approximate offsets, as is the case with the prior art.

More specifically, the gyrometric information indicates the movements of the line of sight and therefore makes it possible to realign the captured images relative to one another by translating the movements of the line of sight in the form of pixel displacements in the captured images.

The stabilization based on the gyrometric measurement data is a reliable stabilization by virtue of the retroactive correction of these gyrometric measurement data. This characteristic makes it possible to obtain a series of stabilized captured images with high quality regardless of the type of the scenes captured, including when a digital processing is not suitable for calculating relevant and reliable offsets. Such may be the case, for example when the images do not contain enough information, such as an image of substantially uniform colour, or when the image is crossed by a moving object moving at high speed disturbing the calculation of the offsets by digital processing. In these cases, only the approximate offsets may be applied in the prior art, whereas here, the stabilization obtained is accurate.

Indeed, in one embodiment of the present invention, by virtue of this retroactive correction of the gyrometric system, the stabilization based on the movements of the line of sight makes it possible to obtain relevant results even in complicated cases, and even if the gyrometers used are not of high quality.

Provision may be made for the stabilization method to also include, after step /c/, the following step:

obtaining a third series of stabilized images by applying, to the second series of stabilized images, a second image stabilization based on a digital image processing taking into account the residual error determined at the preceding step /c/.

In this embodiment, advantageously, the third series of images obtained ultimately may exhibit a stabilization with very high accuracy.

The stabilization which is based on a digital processing relies on a relative analysis of the pixels of the successive images. There is no limitation on such a digital stabilization processing. Provision may be made to determine offsets between two successive images on the basis of a digital correlation such as that described in the document FR 2 828 315, based on an optical stream method.

There is no limitation on the gyrometric system with respect to the present invention. Such a system may comprise a number of gyroscopes. It is possible, for example, to provide for the use of two gyrometers relative to a benchmark image plane and a third gyrometer to determine the information concerning the rotation of the image about the line of sight. It is designed to supply gyrometric measurement data relating to the movement of the line of sight of the capture device. To this end, provision may be made for the gyrometric system to be securely attached to the line of sight of the capture device.

More specifically, at step /b/, first offsets between the successive captured images can be determined on the basis of the movements of the line of sight indicated by the gyrometric information; and at step /c/, second offsets between successive images of the second series can be determined on the basis of the digital image processing.

Thus, first offsets are determined on the basis of gyrometric information and second offsets are determined on the basis of a digital processing for a possible second complementary stabilization, which may advantageously make it possible to ultimately obtain a very efficient result.

It should be noted here that the first offsets are calculated and applied first, and independently of the second offsets, unlike in the prior art. This independence of calculation advantageously makes it possible to easily implement an embodiment of the present invention in an existing architecture.

In one embodiment of the present invention, applying a filtering during the stabilization process is envisaged. The stabilization at step /b/ is then based on gyrometric information filtered by a low-pass filter.

The aim of such filtering is advantageously to filter out the involuntary movements from all the detected voluntary and involuntary movements of the line of sight so as to make it possible to realign the images relative to these involuntary movements. The voluntary movements are generally characterized by a high amplitude and a low frequency. A low-pass filter is suitable for this purpose.

In one embodiment, provision is also made to use the residual stabilization errors as a basis for modelling certain corrections of the gyrometers according to external parameters. Thus, it is advantageously possible to model a correction of the gyrometers according to temperature variations.

Indeed, when a temperature sensor can supply temperature values, the variations of the residual stabilization errors according to temperature variations can be recorded.

This modelling is constructed during the implementation of the method and remains easier to perform than a correction modelling conventionally performed when constructing the gyrometric system in the factory. Furthermore, such a correction modelling according to one embodiment of the present invention may be suited to the modifications that the gyrometers undergo over time since it can easily be updated regularly.

This type of correction model can advantageously be used subsequently on the simple basis of the knowledge of the temperature and no longer on the basis of the residual stabilization error.

Thus, in one embodiment of the present invention, there is also obtained a model for correcting, according to temperatures, gyrometric measurement data on the basis of the residual stabilization errors obtained.

Provision can notably be made to correct the gyroscopic measurement data on such a correction model at the start of the series of the captured images, or else when the captured images do not contain enough information.

In one embodiment of the present invention, step /b/ is based on gyrometric measurement data filtered on the basis of the characteristics of the environment of the gyrometric system.

Provision is made to determine a correction value relative to the gyrometric system according to the residual error obtained at step /c/. This correction value can be obtained by applying a digital filter. This filter uses the residual stabilization errors measured by the digital image processing to automatically refresh the characteristic parameters of the gyrometric system used to correct the measurement data supplied directly by the gyrometric system.

A second aspect of the present invention proposes a stabilization device comprising means designed to implement a stabilization method according to the first aspect of the present invention.

A third aspect of the present invention proposes an image capture system comprising an image capture device designed to capture a series of images on a line of sight, a gyrometric system designed to supply gyrometric measurement data relating to the line of sight and an image stabilization device according to the second aspect of the present invention.

Other aspects, aims and advantages of the invention will become apparent from reading the description of one of its embodiments.

BRIEF DESCRIPTION OF THE DRAWINGS

The invention will also be better understood with the help of the drawings, in which:

FIG. 1 illustrates the main steps of a method according to one embodiment of the present invention;

FIG. 2 illustrates detailed steps of a method according to one embodiment of the present invention;

DETAILED DESCRIPTION

Figure 3:
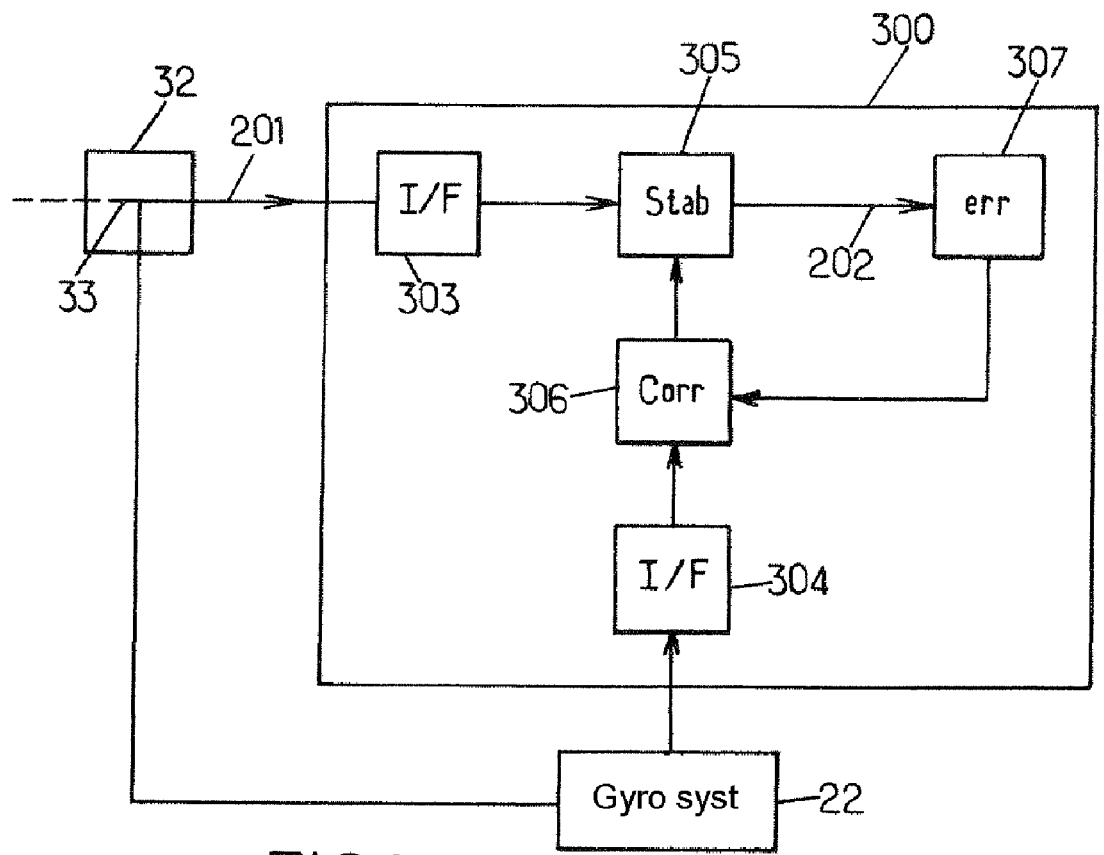
FIG. 3 illustrates the image stabilization device according to one embodiment of the present invention.

In one embodiment of the present invention, a stabilization method is implemented in a stabilization device which is designed to receive a series of images captured by an image capture device, such as a camera, on a line of sight with an associated gyrometric system. The latter is associated with the line of sight of the image capture device so that the measurement data supplied by the gyrometric system indicate movements of this line of sight.

FIG. 1 illustrates the main steps of a method according to one embodiment of the present invention.

While this method is being applied, images are successively captured by the image capture device and a first series of captured images is therefore obtained at a step 11.

The gyrometric system supplies gyrometric measurement data which relate to the movements of the line of sight of the capture device. These measurement data therefore make it possible to determine the movements that the line of sight of the capture device undergoes. However, these measurement data may be more or less accurate.

At a step 12, a stabilization is applied to the series of captured images, on the basis of gyrometric information. The stabilization method is an iterative method. At the first step, the stabilization is performed on the basis of the gyrometric measurement data directly supplied by the gyrometric system. Thus, on initialization, the gyroscopic information corresponds to the raw measurement data supplied by the system. Then, for the subsequent iteration or iterations, this gyroscopic information is advantageously derived from the measurement data corrected on the basis of a residual error as defined hereinbelow.

At this step 12, the gyrometric information is taken into account to determine first offsets between the successive captured images. The captured images can then be realigned relative to one another on the basis of the movement of the line of sight indicated by the gyrometric information. On completion of this first stabilization, a second series of images is obtained.

At a step 13, a residual stabilization error is determined relative to this second series of images by applying a digital processing. Such a digital processing may be that which is described in the document FR 2 828 315, based on an optical stream method.

Thus, firstly, at step 12, provision is made to determine the offsets to be corrected to stabilize the captured images on the basis of gyrometric information and, secondly, at step 13, provision is made to determine residual offset errors still remaining in the second series of stabilized images, on the basis of a digital processing.

The residual errors 13 are transmitted to the gyrometric information, so that the stabilization 12 is advantageously performed by taking into account the corrected gyrometric information.

By virtue of this step 13 for determining the residual error, the data supplied by the gyrometric system can be retroactively corrected. Depending on the context, notably according to the desired stabilization accuracy or else according to temperature variations undergone by the gyrometric system, provision can be made to correct the data from the gyrometric system more or less often.

FIG. 2 illustrates a stabilization method in one embodiment of the present invention. In this method, the part relating to the gyrometric stabilization 12 is detailed. Thus, the stabilization 11 here comprises a correction substep 23 responsible for retroactively correcting the measurement data 22 supplied by the gyrometric system. To this end, both the data supplied by the gyrometric system and characteristic parameters of this system which are advantageously updated, in a step 28, on the basis of step 13, are taken into account.

A substep for determining offsets 24 between successive images is responsible for receiving, on the one hand, the successive captured images and on the other hand gyrometric information obtained by correction of the measurement data. Then, a stabilization substep 25 is responsible for applying the offsets determined at step 24 to the images captured at step 11.

As indicated above, this method comprises a substep for management of the characteristic parameters 28 of the gyrometers of the gyrometric system considered here. This management substep 28 is responsible for updating the characteristic parameters of the gyrometers of the system on the basis of the residual stabilization errors determined over time at step 13.

Furthermore, provision can be made here to apply a digital stabilization to the second series of images obtained on completion of step 25. In practice, it is advantageously possible here to use the residual error calculated in the preceding step 13 to apply a second stabilization 27 to the second series of images in order to obtain a third series of stabilized images.

This third series of images may advantageously exhibit a high quality level.

It can clearly be seen that the method according to one embodiment of the present invention can be easily implemented in an already existing architecture within which an image offset correction is already applied based on gyrometric measurement data.

FIG. 3 illustrates an architecture of an image capture system according to one embodiment of the present invention comprising an image stabilization device according to one embodiment of the present invention, cooperating with an image capture device and a gyrometric system.

Such a captured image stabilization device 300 is designed to stabilize the images captured by an image capture device 32 on a line of sight 33 with an associated gyrometric system 22.

This stabilization system comprises:
said stabilization device comprising:
   a first interface unit 303 designed to receive a first series of captured images 201;
   a second interface unit 304 designed to receive gyrometric measurement data from the gyrometric system;
   a stabilization unit 305 designed:
      to apply an image stabilization based on gyrometric information; and
      to supply a second series of images 202;
   a determination unit 307 designed to determine a residual stabilization error by applying a digital processing to the second series of stabilized images;
   a measurement correction unit 306 designed to supply the gyrometric information by correcting the measurement data supplied for the gyrometric system on the basis of the residual stabilization error.

Depending on the context of use of an image capture system, there may be a desire to stabilize the captured images relative to all the movements of the line of sight. In this case, the first stabilization may directly take into account the gyroscopic information as described hereinabove.

In other contexts of use, it may be preferable to stabilize the captured images only relative to involuntary movements of the line of sight, but not relative to the voluntary movements. To this end, it is possible to provide for the gyrometric information making it possible to determine the movements of the line of sight of the capture device to be filtered.

The second interface unit 304 may then also comprise a low-pass filter designed to filter the gyrometric information. This low-pass filter is designed to filter out the voluntary movements and thus allow for a realignment (or stabilization) of the captured images on the basis of the involuntary movements, as is described hereinbelow with reference to FIG. 4.

It is also possible to provide for another filtering to be applied to the gyrometric measurement data supplied by the gyrometric system. This filtering corresponds to the determination of gyroscopic measurement data correction values and it is implemented in the measurement correction unit 306. This filter may take into account characteristic parameters of the gyrometers used which may be obtained from residual errors relating to the gyrometric system determined while implementing a method according to one embodiment of the present invention.

Figure 4:
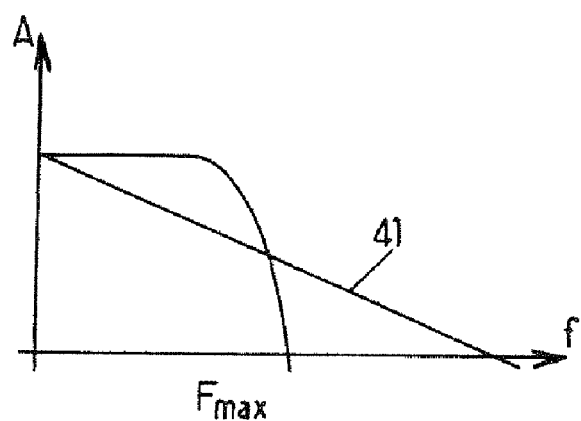
FIG. 4 illustrates a filtering according to one embodiment of the present invention.

FIG. 4 illustrates the application of the filtering to the movements. The movements detected by the gyrometric system may correspond both to voluntary movements of the line of sight and to involuntary movements. The detected movements 41 are illustrated on a curve representing the frequency of the movements on the X-axis and their amplitude on the Y-axis. The movements that have a frequency greater than a maximum threshold frequency $F_{max}$ are filtered because they are considered as involuntary movements.

This filtering makes it possible to stabilize the captured images 201 relative to the involuntary movements of the line of sight.

Advantageously, the retroactive correction of the gyrometric system makes it possible to avoid drifts over time in the gyrometric measurements and thereby obtain an accurate stabilization regardless of the conditions of use of the image capture system.

Furthermore, given that the gyrometric information is accurate and reliable, the architecture of the stabilization device according to one embodiment of the present invention makes it possible to substantially reduce the complexity of the digital calculations performed.

The invention claimed is:

1. A method for stabilizing images captured by an image capture device on a line of sight with an associated gyrometric system designed to supply gyrometric measurement data relating to the line of sight, said method comprising the following steps:
   /a/ obtaining a first series of captured images;
   /b/ obtaining a second series of stabilized images by applying, to the first series of images, an image stabilization based on gyrometric information;
   /c/ determining a residual stabilization error by applying a digital processing to the second series of stabilized images; and
   /d/ repeating steps /a/ to /c/;
wherein, on the first iteration of step /b/, the gyrometric information corresponds to the measurement data supplied by the gyrometric system, and on an iteration following step /b/, the gyrometric information is obtained by correcting, on the basis of said residual error, the measurement data supplied by the gyrometric system.

2. The image stabilization method according to claim 1, also comprising, after step /c/, the following step:
   obtaining a third series of stabilized images by applying, to the second series of stabilized images, a second image stabilization based on a digital image processing taking into account the residual error determined at the preceding step /c/.

3. The image stabilization method according to claim 2, wherein, at step /b/, first offsets between the successive captured images are determined on the basis of the movements of the line of sight indicated by the gyrometric information; and
   wherein, at step /c/, second offsets between successive images of the second series are determined on the basis of the digital image processing.

4. The image stabilization method according to claim 1, wherein the gyrometric information is filtered by a low-pass filter.

5. The image stabilization method according to claim 1, wherein there is also obtained a model for correcting, according to temperatures, gyrometric measurement data on the basis of the residual stabilization errors obtained.

6. A device for stabilizing images captured by an image capture device on a line of sight with an associated gyrometric system designed to supply gyrometric measurement data relating to the line of sight, said stabilization device comprising:
   a first interface unit designed to receive a first series of captured images;
   a second interface unit designed to receive gyrometric measurement data from the gyrometric system;
   a stabilization unit designed:

to apply to the first series of captured images an image stabilization based on gyrometric information in order to obtain a second series of images; and to supply the second series of images;

a determination unit designed to determine a residual stabilization error by applying a digital processing to the second series of stabilized images;

a measurement correction unit designed to supply the gyrometric information by correcting the measurement data supplied for the gyrometric system on the basis of the residual stabilization error.

7. The image stabilization device according to claim 6, wherein the second interface unit also comprises a low-pass filter designed to filter the gyrometric information.

8. An image capture system comprising an image capture device designed to capture a series of images on a line of sight, a gyrometric system designed to supply gyrometric measurement data relating to the line of sight and an image stabilization device comprising:

a first interface unit designed to receive the first series of captured images;

a second interface unit designed to receive gyrometric measurement data from the gyrometric system;

a stabilization unit designed:

to apply to the first series of captured images an image stabilization based on gyrometric information in order to obtain a second series of images; and to supply the second series of images;

a determination unit designed to determine a residual stabilization error by applying a digital processing to the second series of stabilized images;

a measurement correction unit designed to supply the gyrometric information by correcting the measurement data supplied for the gyrometric system on the basis of the residual stabilization error.

9. The image capture system according to claim 8, wherein the second interface unit also comprises a low-pass filter designed to filter the gyrometric information.

* * * * *